(12) United States Patent
Cerroni

(10) Patent No.: US 8,234,971 B2
(45) Date of Patent: Aug. 7, 2012

(54) PORTABLE, NON-ELECTRIC PISTON/CYLINDER COFFEE BREWER

(76) Inventor: Peter M. Cerroni, Dublin, NH (US)

( * ) Notice: Subject to any disclaimer, the term of this patent is extended or adjusted under 35 U.S.C. 154(b) by 441 days.

(21) Appl. No.: 12/617,538

(22) Filed: Nov. 12, 2009

(65) Prior Publication Data

US 2010/0116143 A1    May 13, 2010

Related U.S. Application Data

(60) Provisional application No. 61/114,319, filed on Nov. 13, 2008, provisional application No. 61/204,151, filed on Jan. 3, 2009.

(51) Int. Cl.
*A47J 31/18*    (2006.01)
(52) U.S. Cl. ............... 99/287; 99/297; 99/319; 99/323
(58) Field of Classification Search .............. 99/287, 99/297, 302 P, 323, 318, 319
See application file for complete search history.

(56) References Cited

U.S. PATENT DOCUMENTS

| | | | | |
|---|---|---|---|---|
| 881,562 A | * | 3/1908 | Ellis | 99/319 |
| 2,400,613 A | * | 5/1946 | Strahm | 99/319 |
| 2,601,821 A | * | 7/1952 | Johnson | 99/287 |
| 3,596,806 A | * | 8/1971 | Harschel | 222/190 |
| 5,570,623 A | | 11/1996 | Lin | 99/285 |
| 5,943,946 A | | 8/1999 | Chen | 99/297 |
| 6,561,080 B1 | * | 5/2003 | Feeney | 99/319 |
| 6,758,364 B1 | * | 7/2004 | Rohrig | 220/714 |
| 7,559,274 B2 | * | 7/2009 | Wilhite | 99/297 |
| 2009/0229472 A1 | * | 9/2009 | Ferrara, Jr. | 99/323 |

* cited by examiner

*Primary Examiner* — Reginald L Alexander
(74) *Attorney, Agent, or Firm* — Winston & Strawn LLP

(57) ABSTRACT

Provided is a brewing device which is portable and does not require the use of electricity, as well as a method of brewing using the portable brewing device. The device includes an outer cylinder and an inner cylinder that function together like a piston in a cylinder. The inner cylinder includes a filter for holding brewing solids at one end. The inner cylinder is dimensioned to slide within the outer cylinder and create a water tight frictional fit with the outer cylinder. Thus, when the inner cylinder is pushed into the outer cylinder filled with liquid, the liquid is force to pass through the filter and into the inner cylinder as brewed liquid.

20 Claims, 6 Drawing Sheets

PORTABLE, NON-ELECTRIC PISTON/CYLINDER COFFEE BREWER

This application claims the benefit of provisional application Nos. 61/114,319 filed Nov. 13, 2008 and 61/204,151 filed Jan. 3, 2009. The entire content of each prior application is expressly incorporated by reference herein by reference thereto.

TECHNICAL FIELD

The present invention relates to brewing devices. More particularly, the present invention relates to a portable beverage brewing system for various beverages including coffee or tea.

BACKGROUND

Attempts have been made to provide portable coffee brewing devices that may be operated without a power source. These portable devices may be referred to as French presses. The French press comprises a container and a filter plate joined to a shaft. Coffee grounds and water are inserted into the container and mixed together. The filter plate is then inserted into the container and the shaft connected to the filter plate is pushed down so that the filter plate travels down in the container. The filter is arranged so that as it travels down in the container, liquid coffee passes up through the filter plate while the grounds are trapped on or adjacent to the bottom face of the filter plate. Eventually, the liquid coffee in the container is separated from the solid grounds by the filter plate. The container may then be opened and the liquid coffee poured out or consumed directly.

There are several undesirable limitations associated with the use of a French press for making brewed coffee. First, it is difficult to effectively separate the grounds from the liquid coffee. The filter pores must be big enough to allow the liquid coffee to pass therethrough using a reasonable amount of manual pressure to isolate the grounds from the liquid. As a result, small coffee particles also pass through the filter pores and the brewed coffee contains an undesirable quantity of coffee grounds. Second, the brewing process can be lengthy because it takes considerable time to adequately mix the coffee grounds with the water and press the brewed coffee. Thus, the hot water used to make the brewed coffee may cool in the time it takes to brew the coffee.

There is a need for a portable brewing device that effectively separates the solids from the brewed liquid, brews the liquid in a short period of time, and is relatively easy to use, self contained and easy to transport.

SUMMARY OF THE INVENTION

The present invention now provides a portable brewing device that effectively separates solid particles from a brewed liquid. It also provides a portable brewing device that accomplishes the brewing in a relatively short period of time. Further, the portable brewing device is relatively easy and safe to use, self contained and easy to transport. The present invention is described with reference to brewing coffee but is not limited thereto as it may be used to make any type of beverage involving the combination of a liquid and a granular solid.

In particular, the present invention is a portable piston driven brewing device. The device requires no power supply and includes a pair of interoperable cylinders that function like a piston. The cylinders have a hollow tubular construction. The outer cylinder is closed at one end and open at the other end to receive the inner cylinder. The inner cylinder comprises ports on opposing ends. The inner cylinder is configured with outer dimensions to establish a watertight, frictional fit with the interior dimensions of the outer cylinder. The outer surface of the inner cylinder may include a sealing structure, such as an o-ring structure, to ensure the watertight fit between the two cylinders.

The device of the present invention also includes a filter structure. The filter structure comprises a plurality of pores in a mesh-like formation. The filter structure is preferably removably retained within the inner cylinder. The filter structure is used to hold solid particles therein, such as coffee grounds, for example. The filter structure is positioned in the inner cylinder adjacent to the port hole on one end.

In order to use the device, hot water or another liquid of choice, whether hot or cold, is placed in the outer cylinder. The solids of choice are placed in the filter structure and the filter structure is positioned in one end of the inner cylinder and retained in its position by a cap. The end of the inner cylinder having the filter structure is then forced into the outer cylinder through the outer cylinder's opening. This action causes the liquid in the outer cylinder to pass into through filter structure and into the inner cylinder. The pushing of the inner cylinder into the outer cylinder forces the liquid to pass over the solids contained in the filter and out through the pores of the filter into an interior region of the inner cylinder.

DETAILED DESCRIPTION OF THE PREFERRED EMBODIMENTS

Figure 1:
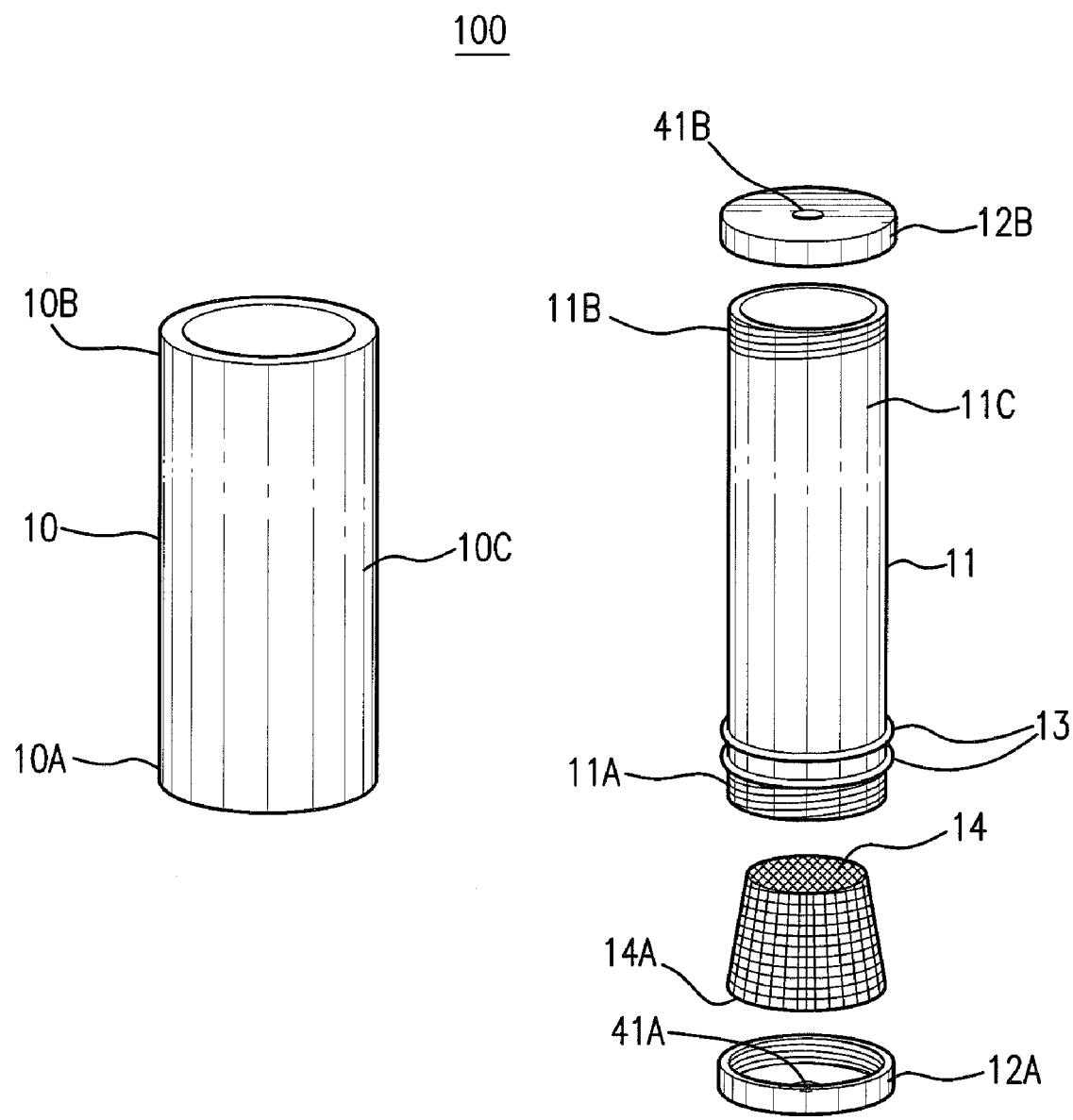
FIG. 1 is an exploded view of the first embodiment portable brewing device of the present invention.
Figures 2A, 2B:
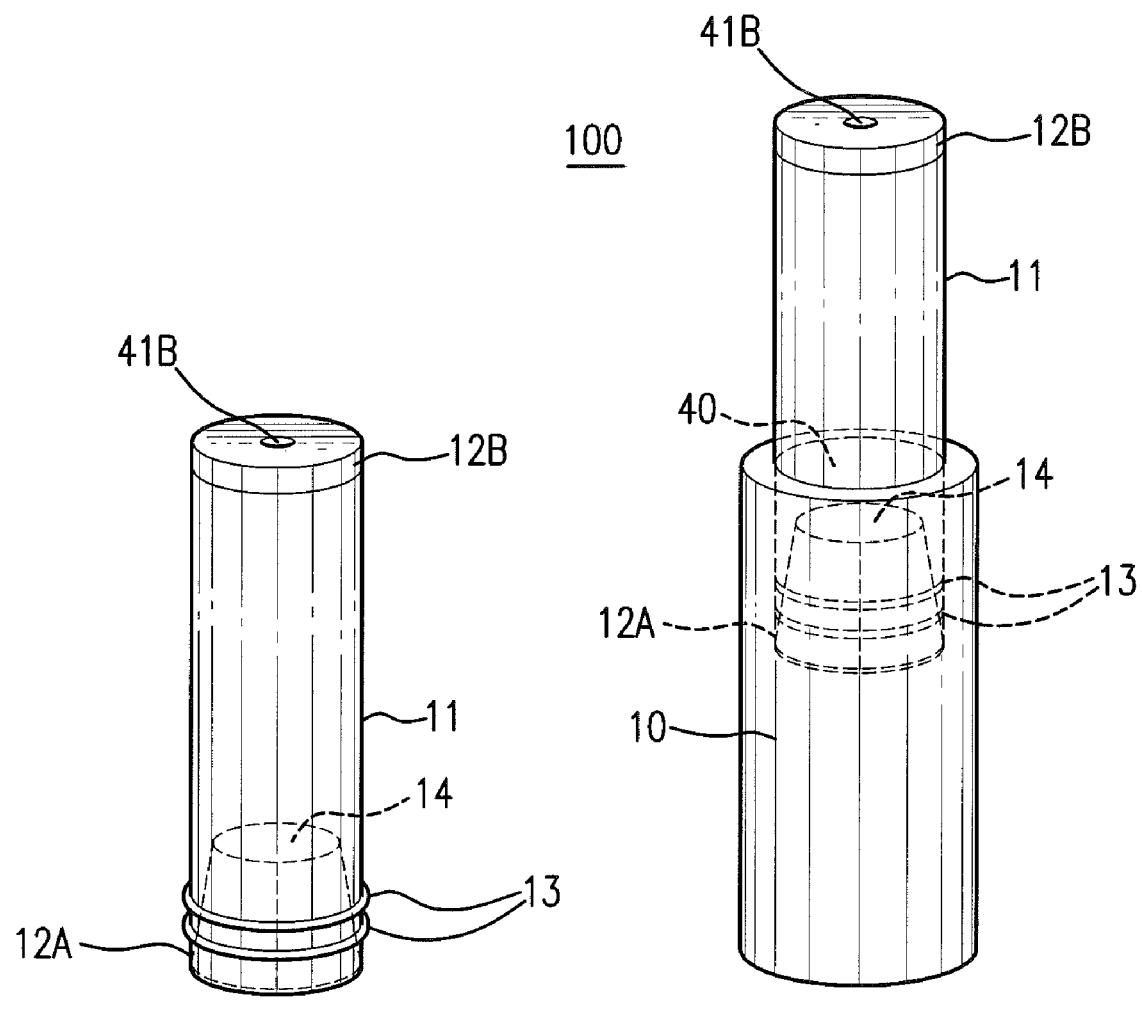
FIG. 2A is a side view of the inner tube of the first embodiment of the portable brewing device with the filter structure in phantom retained therein
FIG. 2B is a side view of the first embodiment of the portable brewing device with the inner tube partially inserted into the outer cylindrical tube and the filter structure shown in phantom.
Figure 3:
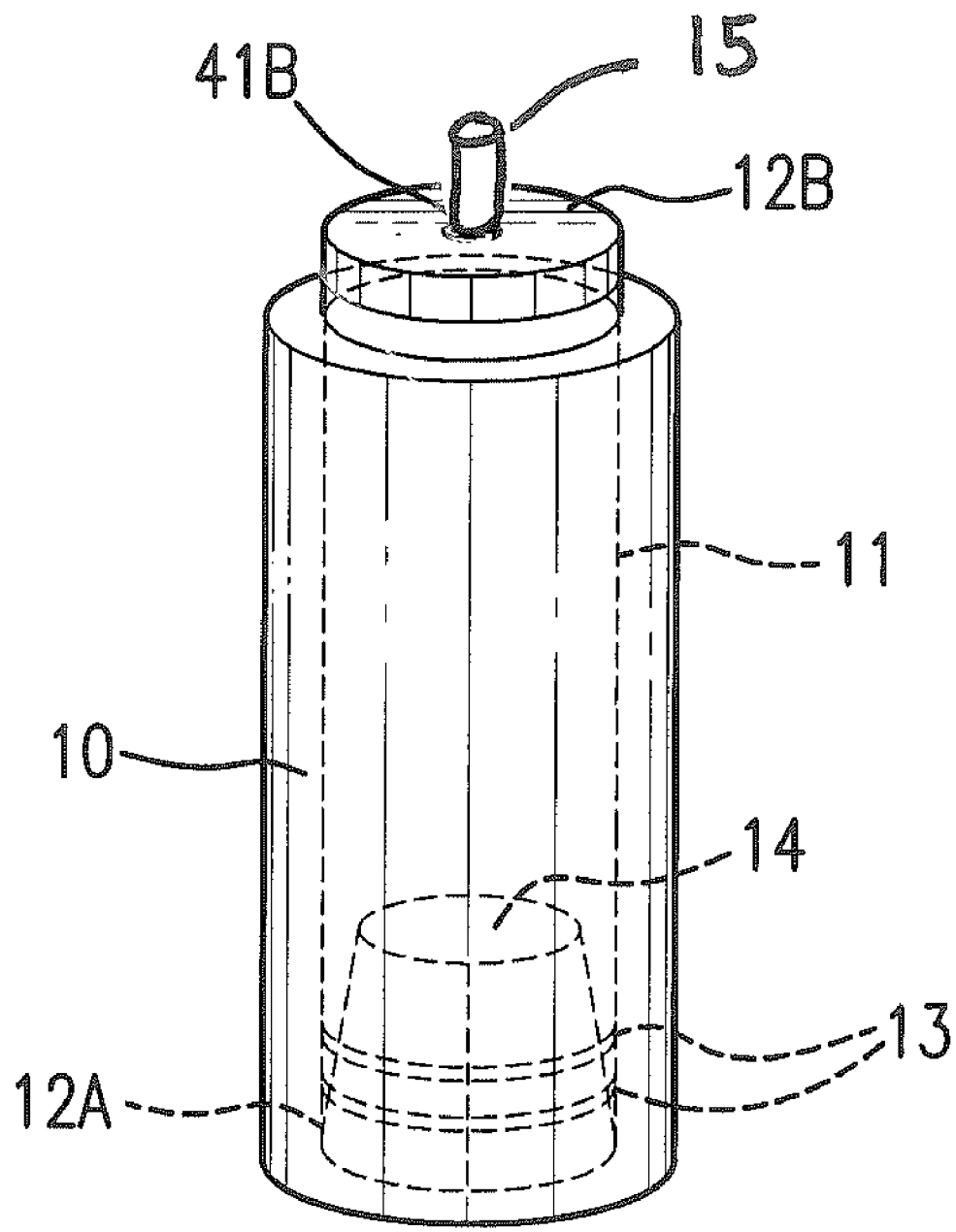
FIG. 3 is a side view of the first embodiment of the portable brewing device with the inner tube and the filter structure shown in phantom within the outer tube.

A first embodiment of a portable coffee brewing device 100 of the present invention is illustrated in FIGS. 1-3. The device 100 includes an outer tube 10, an inner tube 11, a first cap 12A, a second cap 12B, and a filter 14. The device 100 may optionally include a handle disposed on the outer cylinder for easy transport.

In the embodiments disclosed herein, outer tube 10 and inner tube are cylindrical and have circular transverse cross sections. The present invention, however, is not limited to cylindrical tubes 10, 11. For example, outer tube 10 and inner tube 11 may have corresponding square, rectangular, or triangular transverse cross sections.

The outer tube 10 and the inner tube 11 are preferably fabricated of a non-porous material. For example, either or both of the outer tube 10 and the inner tube 11 may be fabricated of stainless steel or aluminum, but they are not limited thereto. More generally, they are preferably fabricated of one or more materials capable of insulating a liquid contained therein.

The outer tube 10 and the inner tube 11 are configured such that the inner tube 11 can slide longitudinally within outer tube 10. Further, the internal dimensions of outer tube 10 and the outer dimensions of inner tube 11 are adapted to provide a close frictional fit between outer tube 10 and inner tube 11 when fitted together. Additionally, one or more sealing means 13, such as o-rings 13, may be disposed on an exterior surface of the inner tube 11 or the interior surface of the outer tube 10 to enable a watertight seal between the inner tube 11 and the outer tube 10. Preferably, the o-rings 13 are disposed at or near a first end 11A of inner tube 11.

Outer tube 10 of device 100 includes closed end 10A, open end 10B, and wall 10C defining an interior space. In the embodiments shown herein, wall 10C forms cylindrical tube having a circular transverse cross section. The present invention, however, is not so limited and may comprise an outer tube 10 having a square, rectangular, or triangular transverse cross section. Open end 10B includes opening 40 having dimensions suitable to receive inner tube 11 therein. Outer tube 10 defines an interior space that is preferably dimensioned to retain the entire inner tube 11 therein. The outer tube 10 may be fabricated such that wall 10C and closed end 10A thereof are integrally formed as a unitary structure. Alternatively, wall 10C and closed end 10A may be fabricated separately and joined together, such as, for example, by welding or bonding.

Figure 4:
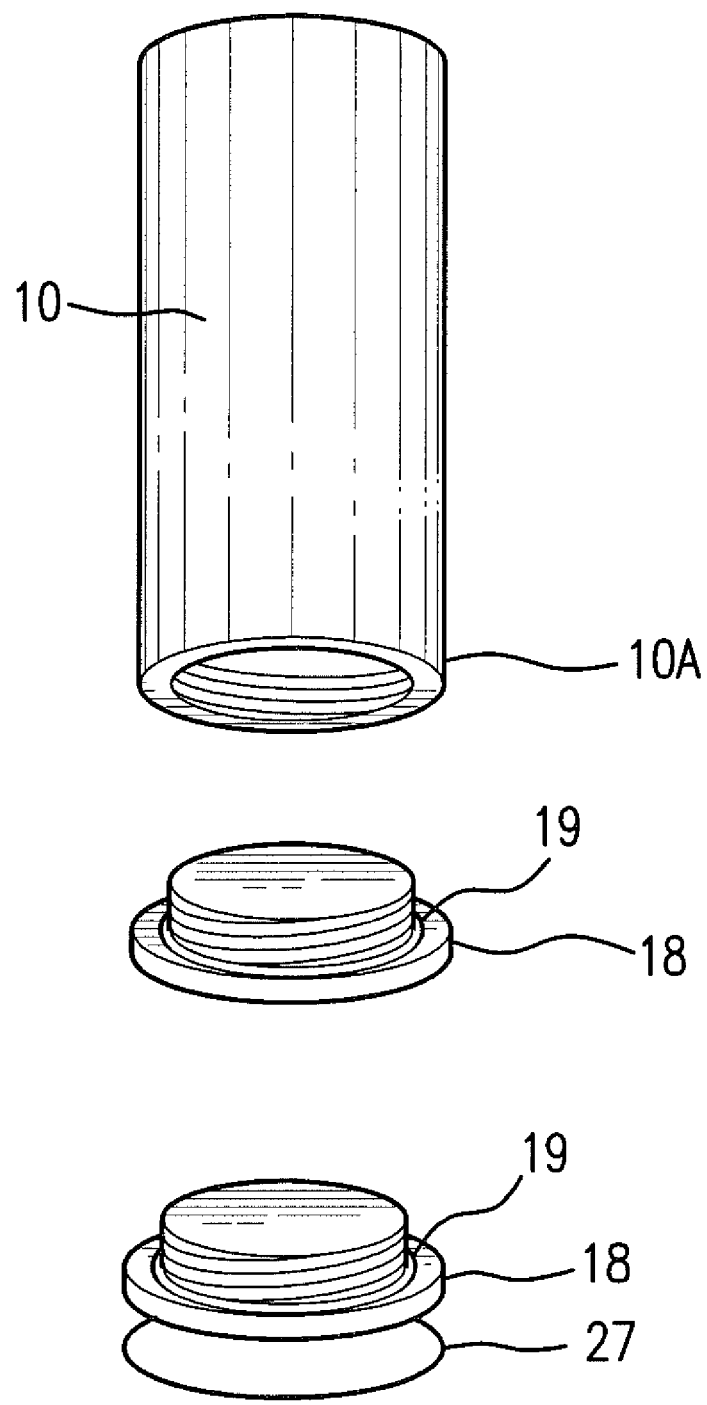
FIG. 4 is a side view of the first embodiment of the outer tube and its removable closure cap.

Also, as illustrated in FIG. 4, closed end 10A may be a removable cap 18 attached to the end of cylinder 10 by any suitable means, such as, for example, mating threads disposed on a surface of the removable cap and a surface on the end of cylinder 10. Closure cap 18 may optionally include sealing means 19, such as a sealing o-ring 19, arranged to minimize leakage of liquid from outer tube 10 and inner tube 11. Closure cap 18 includes a surface that contacts first cap 12A when first cap 12A is attached to first end 11A of inner tube 11. Closed end 10A or removable cap may optionally comprise a suction pad 27 attached thereto to provide stability to device 100 when placed on a support surface.

Inner tube 11 includes a first end 11A, a second end 11B, and a wall 11C. Wall 11C forms a tube defining an interior space and open first and second ends 11A, 11B. In the embodiments shown herein, wall 11C forms cylindrical tube having a circular transverse cross section, corresponding to the cylindrical tube structure of outer tube 10. The present invention, however, is not so limited and may comprise an inner tube 11 having a square, rectangular, or triangular transverse cross section corresponding to the configuration of outer tube 10.

First end 11A and the second end 11B of inner tube 11 include means for removably attaching thereto first cap 12A and second cap 12B, respectively. For example, as illustrated in FIG. 1, first end 11A and second end 11B are threaded for threading engagement with threading on interior side walls of first cap 12A and second cap 12B. First cap 12A includes a first port 41A and second cap 12B includes a second port 41B. Second port 41B may include a one-way valve 15, such as the one-way valves used in water bottles, for example, but is not limited thereto. The valve facilitates drinking brewed liquid directly from inner tube 11 without having to remove end cap 12B.

Any one or more of the caps and lids described herein may be alternatively attached by a quick release structure not requiring rotation to be attached or removed from outer tube 10 and inner tube 11. Also, any one or more of the caps or lids described herein may be textured, such as by knurling, for example, for ease of manipulation. Further, any one or more of the caps or lids described herein may be fabricated with insulative characteristics and generally fabricated to stand up to the environment and usage to be expected.

In the embodiment shown herein, filter 14 is a mesh structure configured to fit within the interior of the inner tube 11. As shown in FIG. 1, filter 14 may be a mesh basket having a truncated cone structure; however, the configuration of filter 14 is not limited thereto. Filter 14 includes a flange 14A disposed around the periphery of filter 14. Flange 14A is preferably dimensioned larger than the interior dimension of inner tube 11 and smaller than the interior dimension of cap 12A, such that filter 14 may be retained in inner tube 11 and cap 12A may be attached to first end 11A of inner tube 11. Filter 14 comprises pores sized small enough to retain therein pieces of solids including, for example, coffee grounds, but not limited thereto. The pores are also sized sufficiently large enough to allow a liquid, such as water, but not limited thereto, to pass through.

Although filter 14 has been shown and described as a separate component, in another embodiment, filter 14 may be permanently affixed to inner tube 11. Filter 14 may be permanently affixed to inner tube 11 by bonding, welding, integrally fabricating it with the inner tube 11, or other means of permanent attachment of the filter 14 to inner tube 11 within the interior of the first end 11A. In this optional arrangement, the used contents of filter 14 may be removed from either end of inner tube 11, such as by forcing cleaning water or solution through first end 11A or second end 11B of inner tube 11.

As shown in FIG. 2A, filter 14 may be filled with coffee grounds and inserted into first end 11A of inner tube 11. Once the filled filter 14 has been inserted into inner tube 11, cap 12A may be attached to first end 11A of inner tube 11. Also, second cap 12B may be attached to second end 11B of inner tube 11. Then, outer tube 10 may be filler with a liquid for brewing. For example, the liquid may be hot water at a temperature sufficient to enable coffee brewing. Outer tube 10 may optionally include a fill line to enable the user to gauge a suitable amount of liquid to add to outer tube 10. Device 100 may be used without a fill line as guidance; however, the user may be subjected to an unexpected stream of hot liquid exiting second port 41B if outer tube 10 is overfilled, or the user may end with a beverage of high flavor concentration if outer tube 10 is underfilled.

As shown in FIG. 2B, the combination of inner tube 11, filter 14, and end caps 12A, 12B may then be inserted into the opening 40 of outer tube 10. As the inner tube 11 is slid down into the interior space of outer tube 10, the liquid is forced to pass through first port 41A, through filter 14, and into the interior space of inner tube 11 due to the frictional fit between inner tube 11 and the outer tube 10 and/or sealing means 13. The liquid contacts the solids (e.g. coffee grounds) within filter 14 to produce a brewed liquid.

With reference to FIG. 3, when inner tube 11 is completely pushed down into the interior space of outer tube 10, first cap 12A is at or near the bottom of closed end 10A of outer tube 10. The substantial pressure produced by the piston action generated by forcing inner tube 11 into outer tube 10 causes the liquid to contact substantially all of the surfaces of the solids in the filter 14 and pass through the pores of the filter 14 in substantially all directions before reaching the interior space of inner tube 11 as brewed liquid. The brewed liquid may then be poured from the interior region of the inner tube 11 via second port 41B of second cap 12B. Alternatively, second cap 12B may be removed and the brewed liquid may be poured or consumed directly from inner tube 11.

Once the brewed liquid has been substantially removed from the interior of inner tube 11, inner tube 11 may be withdrawn from outer tube 10. First end cap 12A may be detached from end 11A and filter 14 removed from within inner tube 11 for cleaning and/or refilling as desired.

Figure 5:
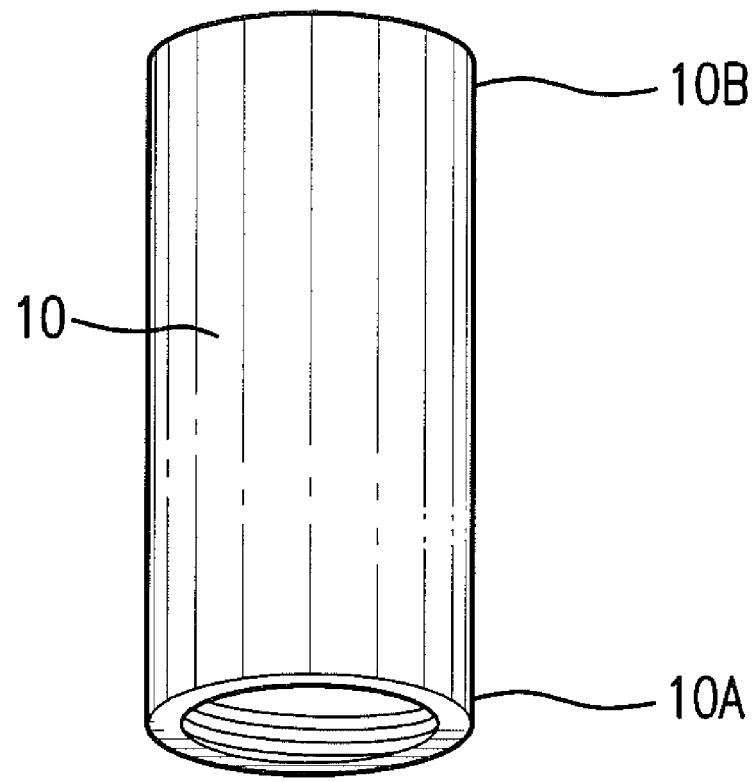
FIG. 5 is a side view of the outer tube of a second embodiment of the portable brewing device having a removable base with a conduit for attachment to a liquid supply.
Figure 5:
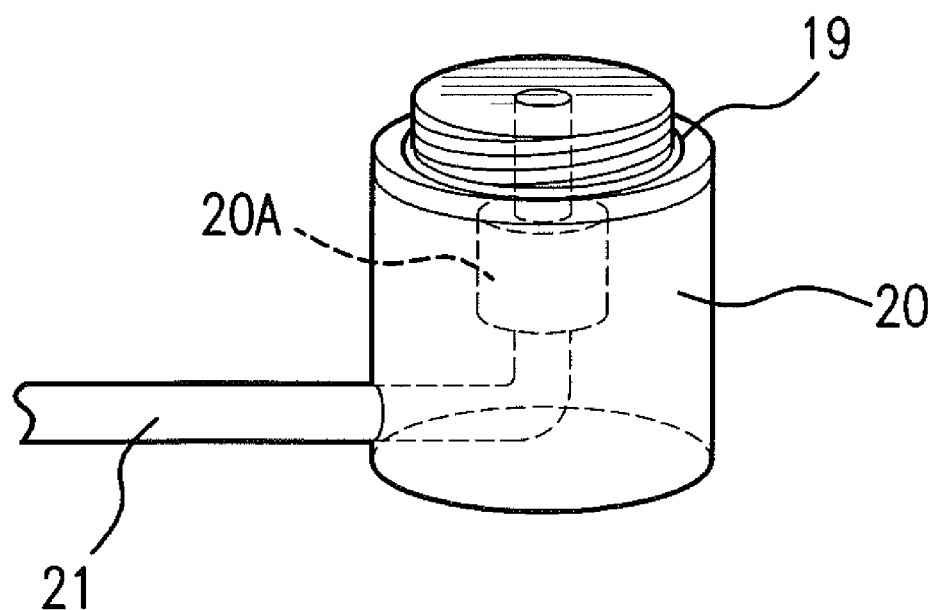
Figure 6:
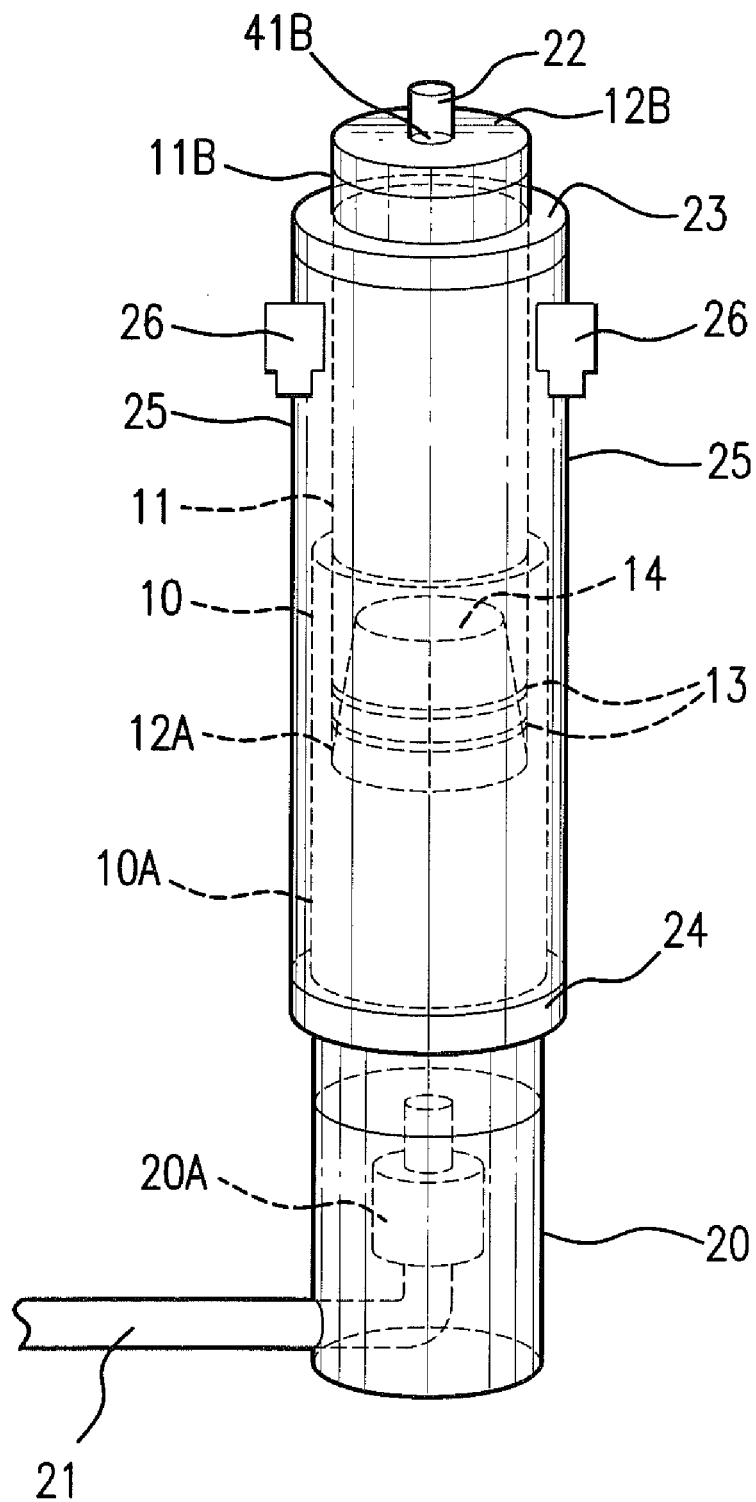
FIG. 6 is a side view of the second embodiment of the portable brewing device with the inner cylinder partially inserted into the outer cylinder and the filter structure shown in phantom.

A second embodiment of the portable brewing device 200 of the present invention is illustrated in FIGS. 5 and 6. In this embodiment, device 200 operates in substantially the same manner as described with respect to device 100, wherein like elements are represented by the same element numbers. However, in the second embodiment, outer tube 10 does not have a closed end and, instead, has a first open end 10A and a second open end 10B.

While outer tube 10 of device 200 does not have a closed end, it includes a supply cap 20 removably attached to first end 10A of outer tube 10. Supply cap 20 includes means for removably attaching supply cap 20 to first open end 10A of inner tube 10. For example, supply cap 20 may include threading for threading engagement with threading on a surface of outer tube 10. Supply cap 20 may be fabricated with any suitable material having the necessary structural characteristics for its intended purpose. Supply cap 20 includes a pressure valve 20A to regulate the introduction of liquid into the interior region of outer tube 10. Pressure valve 20A may be a quick disconnect valve. Pressure valve 20A is removably connected to a liquid conduit, such as tubing 21, which may be coupled to a liquid supply (not shown). The supply cap 20 may include a recess for removably retaining the tubing 21 therein. The supply cap 20 provides a means for introducing hot liquid to the device 200 which minimizes the direct handling of hot water and the risk of burning.

With specific reference to FIG. 6, device 200 includes access valve 22 removably connected to second cap 12B at second port 41B. Access valve 22 may be a one-way valve, such as one-way valve 15 shown with respect to brewing device 100 in FIG. 3 or the one-way valves used in water bottles, for example, but is not limited thereto. Access valve 22 provides access to the brewed liquid produced by forcing the liquid through the solids contained in filter 14 within inner tube 11.

Device 200 of the second embodiment of the present invention may be operated to make a plurality of batches of brewed liquid without completely removing inner tube 11 from outer tube 10. Specifically, inner tube 11 may be partially withdrawn from the interior space of outer tube 10, liquid may be introduced into the interior space of outer tube 10 via tubing 21 and supply valve 20A, and then inner tube 11 may be pushed down into the interior space of outer tube 10 to force the liquid through the solids in filter 14. The brewed liquid may then be removed via access valve 22 and the process repeated as desired. Thus, inner tube 11 may need only be removed to replace the solids in filter 14.

Device 200 of the second embodiment may optionally include a webbing/sleeve/tether 25 releasably connecting outer tube 10 and inner tube 11 to prevent outer tube 10 and inner tube 11 from completely separating from each other. Webbing/sleeve/tether 25 is attached to outer tube 10 and inner tube 11 such that the full range of functional motion between outer tube 10 and inner tube 11 is permitted. For example, as shown in FIG. 6, webbing/sleeve/tether 25 is attached to first and second range-of-motion limiters 23, 24. As shown, first range-of-motion limiter 23 and second range-of-motion limiter 24 may be collar structures disposed around second end 11B of inner tube 11 and first end 10A of outer tube 10, respectively. Webbing/sleeve/tether 25 releasably connects the first and second range-of-motion limiters 23, 24 and may optionally be used as a handle for carrying or securing device 200. The webbing 25, sleeve 25, or tether 25 may be releasably connected to the first and second range-of-motion limiters 23, 24, or another location on the device 200 with one or more quick disconnect fasteners 26. The quick disconnect fasteners may be release clasps or other suitable coupling devices known to those of skill in the art.

What is claimed is:

1. A portable brewing device, comprising:
    an outer tube having internal dimensions defining an interior space and having a closed end and an open end;
    an inner tube having outer dimensions slightly smaller than the internal dimensions of the outer tube so that the inner tube is adapted to slide linearly without rotational movement and with uninterrupted reciprocal movement throughout the interior space of the outer tube, the inner tube also defining an interior space and a first open end and a second open end;
    a mesh filter adapted to be retained in the first open end of the inner tube;
    a first cap having a port hole extending therethrough, the first cap being adapted to be removably attached to the first open end of the inner tube over the mesh filter; and
    a second cap having a port hole extending therethrough, the second cap being adapted to be removably attached to the second open end of the inner tube.

2. The device of claim 1, wherein internal dimensions of the outer tube and outer dimensions of the inner tube are both uniform and adapted to provide a close frictional fit between the outer tube and the inner tube when fitted together and to allow the uninterrupted reciprocal sliding movement of the inner tube throughout the outer tube.

3. The device of claim 1 further comprising an o-ring disposed on an outer surface of the inner tube such that a watertight seal is created between the outer tube and the inner tube when the inner tube is inserted and slid into the outer tube.

4. The device of claim 1 wherein the closed end of the outer tube comprises a closure cap removably attached to the outer tube.

5. The device of claim 1, wherein the outer tube and the inner tube are cylindrical tubes having circular transverse cross sections.

6. The device of claim 1 further comprising a valve connected to the port hole of the second cap.

7. The device of claim 1, wherein the mesh filter has a basket configuration adapted to hold solid particles.

8. The device of claim 1, wherein the mesh filter is integrally formed with the inner tube or is fixedly attached to the inner tube.

9. A portable brewing device comprising:
    an outer tube defining an interior space and having a closed end and an open end;
    an inner tube adapted to slide throughout the interior space of the outer tube, the inner tube defining an interior space and a first open end and a second open end;
    a mesh filter adapted to be retained in the first open end of the inner tube and having a basket configuration adapted to hold solid particles;
    a first cap having a port hole extending therethrough, the first cap being adapted to be removably attached to the first open end of the inner tube over the mesh filter; and a second cap having a port hole extending therethrough, the second cap being adapted to be removably attached to the second open end of the inner tube; and a flange disposed around the opening of the basket, the flange being dimensioned larger than an interior dimension of the inner tube and smaller than an interior dimension of the first cap, such that the filter may be retained in the inner tube and the first cap may be attached to the inner tube.

10. A portable brewing device, comprising:

an outer tube defining an interior space and having a first open end and a second open end;

a supply cap removably attached to the first open end of the outer tube, the supply cap having a valve for introducing liquids to the interior space of the outer tube;

an inner tube adapted to slide linearly within the interior space of the outer tube, the inner tube defining an interior space and a first open end and a second open end;

a mesh filter adapted to be retained in the first open end of the inner tube;

a first cap having a port hole extending therethrough, the first cap being adapted to be removably attached to the first open end of the inner tube over the mesh filter;

a second cap having a port hole extending therethrough, the second cap being adapted to be removably attached to the second open end of the inner tube; and an o-ring disposed on an outer surface of the inner tube such that a watertight seal is created between the outer tube and the inner tube when the inner tube is inserted and slid into the outer tube.

11. The device of claim 10 further comprising supply tubing connected to the valve of the supply cap and connected to a hot water source.

12. The device of claim 10 further comprising an access valve connected to the port hole of the second cap attached to the inner tube for providing access to the brewed liquid in the inner space of the inner tube.

13. The device of claim 10, wherein internal dimensions of the outer tube and outer dimensions of the inner tube are adapted to provide a close frictional fit between the outer tube and the inner tube when fitted together.

14. The device of claim 10 further comprising an o-ring disposed on an outer surface of the inner tube such that a watertight seal is created between the outer tube and the inner tube when the inner tube is inserted and slid into the outer tube.

15. The device of claim 10, wherein the outer tube and the inner tube are cylindrical tubes having circular transverse cross sections.

16. The device of claim 10, wherein the mesh filter has a basket configuration adapted to hold solid particles such as ground coffee.

17. The device of claim 16 further comprising a flange disposed around the opening of the basket, the flange being dimensioned larger than an interior dimension of the inner tube and smaller than an interior dimension of the first cap, such that the filter may be retained in the inner tube and the first cap may be attached to the inner tube.

18. The device of claim 10, wherein the mesh filter is integrally formed with the inner tube or is fixedly attached to the inner tube.

19. The device of claim 10 further comprising means for limiting the movement of the inner tube with respect to the outer tube.

20. The device of claim 19 wherein the means for limiting the movement of the inner tube with respect to the outer tube comprises a web, sleeve or tether detachably connecting the inner tube and outer tube.

* * * * *